Dec. 17, 1946.  H. B. NELSON  2,412,630
LIMITED TORQUE COUPLING
Filed May 22, 1945  2 Sheets-Sheet 1
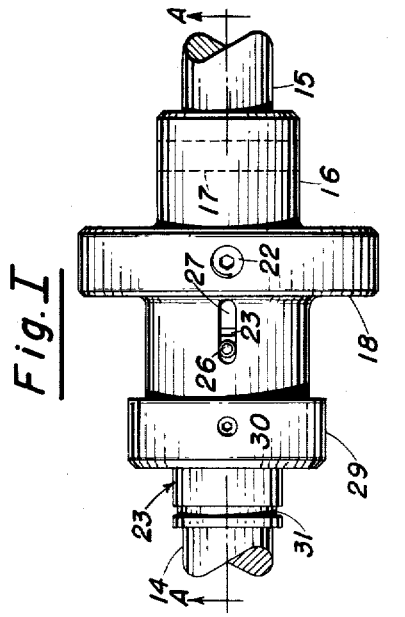
Fig. I
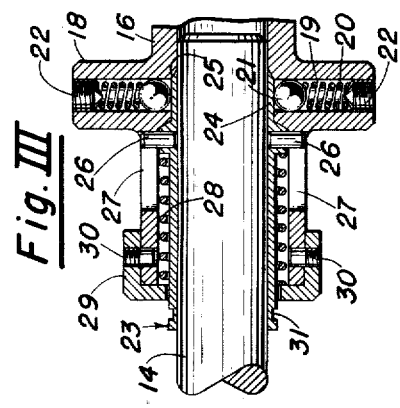
Fig. III
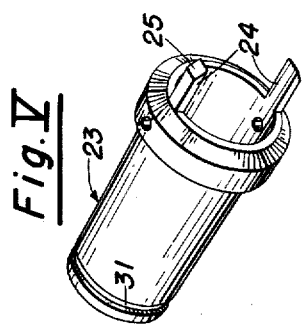
Fig. V
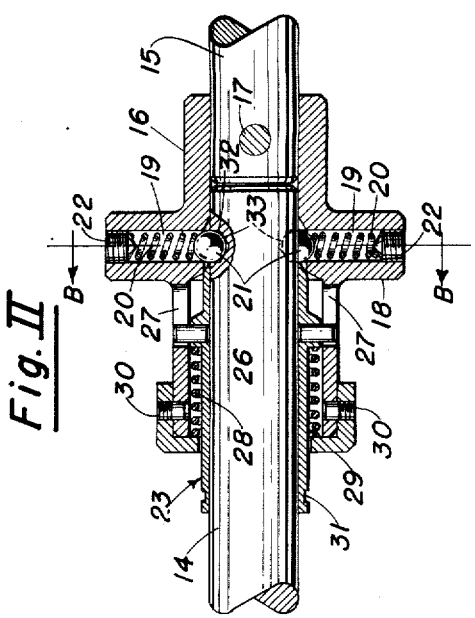
Fig. II
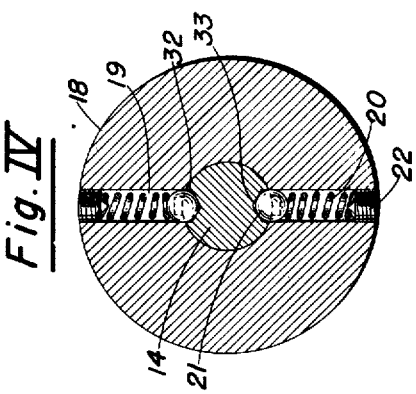
Fig. IV
Inventor
Homer B. Nelson
By Ralph L Chappell
Attorney Dec. 17, 1946.  H. B. NELSON  2,412,630
LIMITED TORQUE COUPLING
Filed May 22, 1945  2 Sheets-Sheet 2
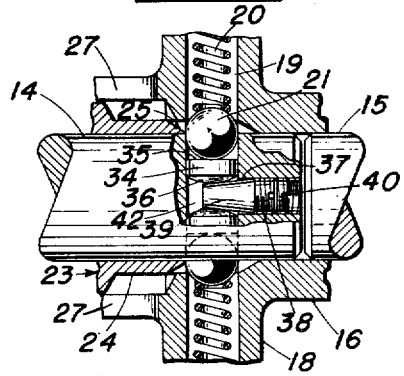
Fig. VI
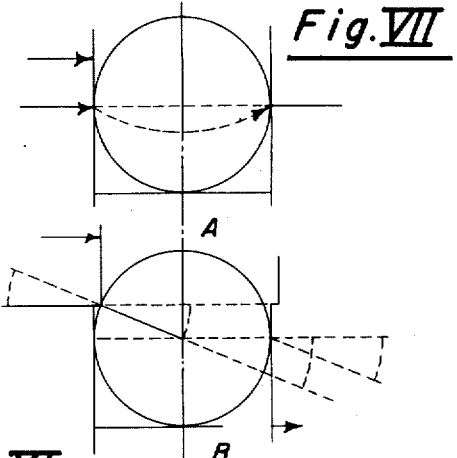
Fig. VII
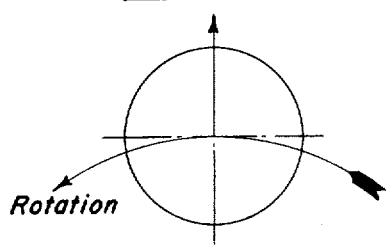
Fig. VIII
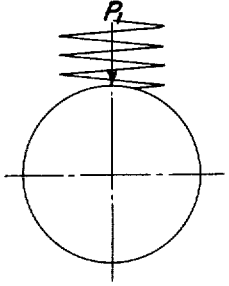
Fig. XI
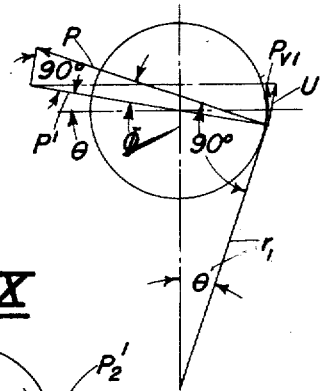
Fig. IX
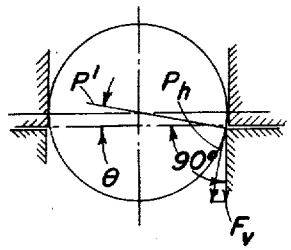
Fig. XII
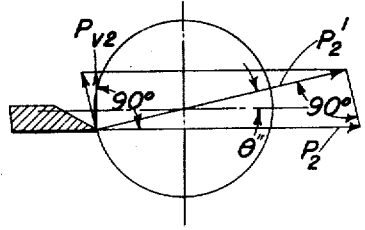
Fig. X
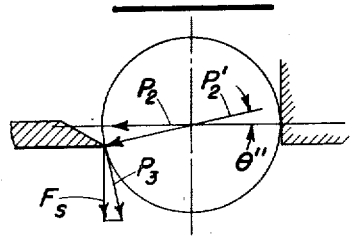
Fig. XIII
Inventor
Homer B. Nelson
By Ralph L Chappell
Attorney Patented Dec. 17, 1946

2,412,630

UNITED STATES PATENT OFFICE 2,412,630

LIMITED TORQUE COUPLING

Homer B. Nelson, United States Navy

Application May 22, 1945, Serial No. 595,225

7 Claims. (Cl. 192—56)

(Granted under the act of March 3, 1883, as amended April 30, 1928; 370 O. G. 757)

This invention relates to an improvement in limited torque couplings.

An object of this invention is to provide an improved limited torque coupling which will release the driving shaft from the driven shaft at a predetermined torque load.

Another object of this invention is to provide an improved limited torque coupling that is retained in a disengaged position after overloading until the coupling is re-engaged manually by the operator to prevent destruction of the coupling by repeated re-engaging and disengaging before the condition causing the overload can be corrected.

A further object of this invention is to provide an improved limited torque coupling that can be adjusted to release at any predetermined torque load.

Another object of this invention is to provide an improved limited torque coupling that can be adjusted to compensate for the effect of centrifugal force set up within the coupling.

Other objects and advantages of this invention will become apparent as the discussion proceeds and is considered in connection with the claims and accompanying drawings wherein like characters of reference designate like parts in the several views and wherein:

Fig. I is a plan view of the coupling embodied in this invention.

Fig. II is a cross-sectional view of the assembled coupling embodied in this invention taken on the line A—A of Fig. I showing the coupling engaged.

Fig. III shows a partial fragmentary sectional view of the coupling during disengagement.

Fig. IV is a cross-sectional view of the coupling embodied in this invention taken on the line B—B of Fig. II.

Fig. V is a perspective view of a clutch hold out sleeve and bearing embodied in this invention.

Fig. VI shows a partial sectional view of a modification of this invention provided with means to adjust the torque load of the coupling.

Fig. VII shows a diagrammatic illustrative view illustrating the components of force that act upon the ball-key when the ball-key is in a static position.

Figs. VIII, IX, X, XI, XII, and XIII are diagrammatic illustrative views showing the various component of forces acting upon the ball-key in this invention.

Referring now to the drawings, wherein for the purpose of illustration, is shown a preferred embodiment of this invention, the numeral 14 designates a driven shaft axially in line with a drive shaft 15. A housing 16 is rigidly secured in any suitable manner, such as by a key or pin 17 to the driving shaft 15, as shown. The said housing is provided with an outward extending radial flange like portion 18, details of which are shown more clearly in Fig. IV. Annular passages or holes 19, having their centers perpendicular to the center line of the drive and driven shafts, are provided in the said flange portion 18 and carry a compression spring 20 and ball-key 21. Said ball-keys have a sufficiently less diameter than the passages 19 to permit free movement therein. Set screws 22 are threadably provided in the upper or outer end of the passage 19 to vary the compression on spring 20.

A machine fitted compression clutch hold-out and bearing sleeve 23, of any suitable material such as bronze, etc., is provided to rotate with but slide laterally within the housing 16 and to serve as a bearing between the driven shaft 14 and the said housing. Prongs or fingers 24 provided on the said clutch sleeve 23, as shown in Fig. V, are formed with tapered end portions 25 which engage against the ball-keys 21. Rigidly affixed to the sleeve 23 is a key 26 which is adapted for slidable engagement with a slot 27 in the housing, as shown, in Fig. I, and permits lateral movement of the said sleeve but at the same time keeps the sleeve in axial alignment with the housing, thereby holding the tapered end portions 25 in radial position to the ball-keys 21. A second compression spring 28, as shown in Fig. II, urges the sleeve 23 toward the flange 18, and thus keeps the tapered end portions 25 against the ball-keys 21 during engagement of the coupling and the prongs 24 under the ball-keys during disengagement. Fig. III shows the sleeve urged forward and the prongs 24 under the ball-key 21 during disengagement of the coupling. A retaining cap 29 bearing against the spring 28, is fitted over the end of the housing 16 and is held in place by a lock screw 30. An annular groove 31 is provided in the end of the sleeve 23 to carry any suitable form of slip ring or the like (not shown) for manually actuating the sleeve to the engaging position.

In the modification shown in Fig. II drilled recesses 32 having ball-seats 33 are provided in the driven shaft to correspond to the passages 19. The ball-seats 33 of the recesses 32 are machined to a predetermined depth, calculations for which will be explained later, dependent upon the torque load at which the coupling is desired to disengage. Thus a variation of the depth of the ball-seat 33 will determine the angle of contact for disengagement at a certain torque load, as illustrated by Figs. VII to XIII by giving different angles of contact between the ball-keys 21, the passages 19 of the driving shaft and the drilled recesses 32 of the driven shaft.

In the modification shown in Fig. VI the depth at which the ball-seats 33 are set is made variable to provide adjustment of the torque load at which the coupling will disengage. The drilled recesses 32 are replaced by a single passage 42 drilled vertically through the driven shaft coincident in circumference at each end with the inner ends of the passage 19. Lugs 34 having substantially flat surfaces on the top or outer side to form a seat 35 for the ball-keys 21 and having a substantially rounded surface 36 on the bottom or inside are slidably inserted in the passage 42. A second passage 37, with its center coincident with and running parallel the center of the driven shaft 14, is drilled in the end of the driven shaft adjacent to the drive shaft, sufficiently deep to communicate through the passage 42. A set screw 38 having a tapered end 39 is threadably inserted in the passage 37 until the tapered end 39 engages against the rounded surfaces 36 of the lugs 34, as shown in Fig. VI. A lock screw 40 holds the set screw in position. The depth of the seat 35 is varied by moving the tapered set screw in or out against the lugs 34 which in turn varies the torque load at which the coupling will release. It is to be noted that dirt or any foreign matter working between the ball-key and the seat, spring or passage will cause mal-function of the coupling, therefore the parts of the coupling should be machined to fit as accurately as good practice will permit. It is also to be noted that the structure of the coupling shown in both modifications of this invention, keeps the entrance of dirt or foreign matter to a minimum.

In operation, motion is transmitted to the driven shaft by the driving force exerted by the housing through the ball-key. If the component of this driving force is transmitted parallel to the center of gravity of the coupling, and passes through the center of the ball-key, as illustrated in "A" of Fig. VII, as will be the case when the seat of the ball-key is set so that the center of the ball-key is coincident with the line of contact between the housing and the driven shaft; or again where the component of the driving force is downward, as in the case of "B" of Fig. VII, when the seat of the ball-key is set so that the center of the ball-key is below or toward the center of gravity of the coupling, the said ball-key will be in a static position and the coupling will not function as a limited torque coupling. It follows that the converse is true; i. e. whenever the component of the driving force is upward through the center of the ball-key, as in the case illustrated by Fig. X, the coupling will act as a limited torque coupling. The specific torque which will cause the ball-key to rise from the seat upward into the passage 19, thereby disengaging the coupling, is governed by the angle $\theta$ in Fig. X, which in turn is determined by the depth of the ball-seat. The specific torque at which any coupling is to release being known, the depth to which the seat 32 is to be machined in the modification shown in Fig. II, and the depth to which the seat 35 is to be set by the screw 38 in the modification shown in Fig. VI, can readily be computed from the formula set out below.

Centrifugal force exerted by the ball-keys 21 during the rotation of the coupling in the modification shown in Fig. II, and by the ball-keys 21 and the lugs 34 during the rotation of the coupling in the modification shown in Fig. VI, is neutralized by the compression spring 20. Formula for computing the centrifugal force exerted, by the ball-keys of any specific coupling can readily be computed from the formula given in the tables below. Knowing the centrifugal force exerted by any specific ball key the size compression spring to counteract this force can be ascertained from conventional tables for springs. The set screw 22 is provided to give a more precise adjustment of the compression on the spring 20. As will be observed from the formula set out below, the coefficient of friction throughout the coupling is a critical factor, therefore the force exerted by the points 25 against the ball-keys 21 during engagement of the coupling, must be computed and considered as one factor in computing the depths to which the ball-seats 32 and 35 are to be set. Formula for this calculation is set out in the table below.

Once the ball-keys are forced out of their seats in disengagement the pressure of the spring 28 will urge the prongs 24 forward under the ball-keys and will hold the said keys and consequently the coupling out of engagement, as shown by Fig. III, until the said sleeve in manually returned to its engaging position as shown in Fig. II.

The following table, with notes, explanations, and key to the various symbols, sets out the various formulae explaining the forces acting upon the ball key in this invention. From this table computations can be made for ascertaining the various settings for the coupling embodied in this invention.

*Mathematical formulae and free body diagrams involved in principle of operation*

| Forces with direction away from the center of rotation | Forces with direction toward the center of rotation |
|---|---|
| See Figure VIII | See Figure XI |
| Centrifugal force $F$ on ball at its center of gravity. $$F = \frac{mv^2}{r}$$ where $$m = \frac{w}{g}$$ | Radial spring compression, $P_1$ $$P_1 = \frac{Gd^4 F_1}{8ND^3}$$ Where $P_1$ = spring compression load for any deflection $F_1$ |
| See Figure IX | See Figure XII |
| Vertical component of drive shaft Torsional force, $P_{v_1}$ $$T = \frac{HP \times 63025}{R.P.M.}$$ $$P = \frac{T}{r_1} = \text{load on ball}$$ $$P_{v_1} = P' \sin \theta$$ NOTE.—When $P$ passes through $cg$ of ball, $P = P'$. This would be a condition peculiar to a specific design. (Assume $P = P'$ since difference is negligible.) | Frictional force $F_v$, resisting vertical component of drive shaft torsional force $$F_v = fP' \cos \theta$$ |
| See Figure X | See Figure XIII |
| Vertical component force $P_{v_2}$ produced by end of clutch sleeve disengaging finger against ball. $$P_{v_2} = P_2 \tfrac{1}{2} \sin 2\theta''$$ | Frictional force $F_s$, resisting vertical component force produced by end of clutch sleeve disengaging finger, which contacts ball with force $P_2$. $$F_s = fP_2 \cos \theta''$$ |

Key to symbols

G = Torsional modulus of elasticity
N = Number of coils
D = Pitch (diameter of spring coil)
d = Diameter of spring wire
M = Mass
W = Weight in pounds
$g = 32.2$ ft./sec.$^2$ (approx.)
V = Velocity, ft./sec.
cg = Center of gravity
T = Torque, in ft./pounds
$r_1$ = Distance from center of rotation to highest contact point of driven shaft on the back side of the ball from rotational direction
$p'$ = Component of force P taken through cg of ball
$\theta$, $\phi$, $\theta'$, and $\theta''$ = Angles as shown
$f$ = Coefficient of sliding friction Note.—(1) When contact of finger and 25 is below center line of ball, $P_{v_2}$ is directed away from center of rotation. (2) When contact of finger end is on center line of ball, $P_{v_2}$ is zero and $F_s = fP_3$.

It is to be understood that the form of this invention herewith shown and described, is to be taken as a preferred example of the same, and that various changes in material, shape, and size may be resorted to, without departing from the spirit of this invention, or the scope of the subjoined claims.

The invention described herein may be manufactured and used by or for the Government of the United States of America for governmental purposes without the payment of any royalties thereon or therefor.

What I claim is:

1. A limited torque coupling comprising a driving element and a driven element, means connecting the driving element to the driven element adapted to disengage the said connection at a predetermined torque load, adjustable means within one of the said elements to vary the torque load at which the first mentioned means will disengage the said connection and resilient means to neutralize the effect of the centrifugal force set up by the said connecting means located in the element opposite the element containing the said adjustable means.

2. A limited torque coupling comprising a driving and a driven element, means including a plurality of locks connecting the said driven element to the said driving element adapted to disengage the said connection at a predetermined torque load and resilient means engaging each of said locks adapted to neutralize the effect of the centrifugal force set up on said locks by the rotation of said connecting means, and common adjustable means to regulate the neutralizing effect of all said resilient means.

3. A limited torque coupling comprising a driving and a driven element, means connecting the driven element to the driving element adapted to disengage the said connection at a predetermined torque load, adjustable means within one element to vary the torque load at which the first mentioned means will disengage the said connection, resilient means engaging the said connection means adapted to neutralize the effect of the centrifugal force set up by the said connecting means located in the element opposite the element containing the said adjustable means and laterally sliding means within one of the elements engaging the said connecting means being adapted to hold the connecting means from reengagement until manually operated.

4. A limited torque coupling comprising a driving shaft and a driven shaft in axial alignment, a housing having an outwardly extending radial flange portion, said flange portion carrying passages, recesses in the driven shaft in radial alignment with the passages in the flange portion, ball-keys in the passages and recesses adapted for driving engagement between the said passages and the said recesses and disengaging at a predetermined torque load, seats in the recesses to govern the torque load at which the said ball-keys disengage the passages from the recesses, a sleeve-bearing in the housing adapted to rotate with but slide laterally within the said housing and prongs affixed to the said sleeve-bearing engaging the said ball-keys and the recesses in the driven element to keep the ball-keys disengaged until manually operated.

5. A limited torque coupling comprising a driving shaft and a driven shaft in axial alignment, a housing having an outwardly extending radial flange portion, said flange portion carrying passages, recesses in the driven shaft in radial alignment with the passages in the flange portion, ball-keys in the passages and recesses adapted for driving engagement between the said passages and the said recesses and disengaging at a predetermined torque load, seats in the recesses to govern the torque load at which the said ball-keys disengage the passages from the recesses, an adjustable set screw in the driven shaft adapted to vary the radial position of the said seat.

6. A limited torque coupling comprising a driving shaft and a driven shaft in axial alignment, a housing having an outwardly extending radial flange portion, said flange portion carrying passages, recesses in the driven shaft in radial alignment with the passages in the flange portion, ball-keys in the passages and recesses adapted for driving engagement between the said passages and the said recesses and disengaging at a predetermined torque load, seats in the recesses to govern the torque load at which the said ball-keys disengage the passages from the recesses, an adjustable set screw in the driven shaft adapted to vary the radial position of the said seat, compression resilient means in the said recesses engaging the said ball-keys adapted to neutralize the effect of the centrifugal force set up by the said ball-keys.

7. A limited torque coupling comprising a driving shaft and a driven shaft in axial alignment, a housing having an outwardly extending radial flange portion, said flange portion carrying passages, recesses in the driven shaft in radial alignment with the passages in the flange portion, ball-keys in the passages and recesses adapted for driving engagement between the said passages and the said recesses and disengaging at a predetermined torque load, seats in the recesses to govern the torque load at which the said ball-keys disengage the passages from the recesses, an adjustable set screw in the driven shaft adapted to vary the radial position of the said seat, compression resilient means in the said recesses engaging the said ball-keys adapted to neutralize the effect of the centrifugal force set up by the said ball-keys, means to adjust the compression of the aforesaid compression resilient means.

HOMER B. NELSON.